July 10, 1951     G. H. AKLIN     2,559,836
HIGH APERTURE CORRECTED PHOTOGRAPHIC OBJECTIVE
COMPRISING FIVE COMPONENTS IN AXIAL ALIGNMENT
Filed Dec. 21, 1949

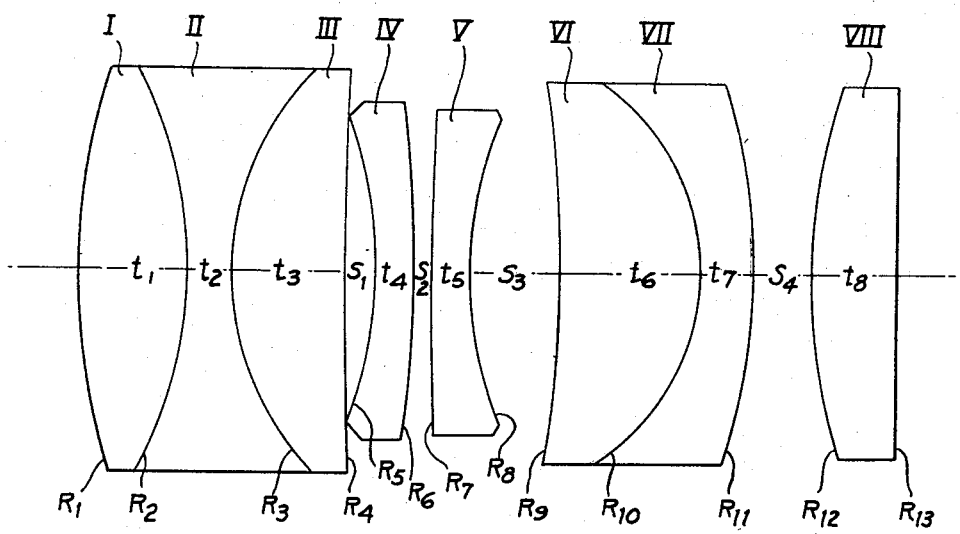

| EF = 100mm | | | | f/1.8 |
|---|---|---|---|---|
| LENS | N | V | RADII | THICKNESSES |
| I | 1.744 | 43.8 | $R_1$ = + 94.0 mm. | $t_1$ = 16.0 mm. |
| II | 1.596 | 39.7 | $R_2$ = − 58.5 | $t_2$ = 6.2 |
| III | 1.804 | 41.8 | $R_3$ = + 42.0 | $t_3$ = 16.3 |
| | | | $R_4$ = +410.0 | $S_1$ = 4.8 |
| IV | 1.649 | 33.8 | $R_5$ = − 64.6 | $t_4$ = 6.0 |
| | | | $R_6$ = − 145.9 | $S_2$ = 2.2 |
| V | 1.689 | 30.9 | $R_7$ = +1480.0 | $t_5$ = 6.0 |
| | | | $R_8$ = + 54.9 | $S_3$ = 13.2 |
| VI | 1.734 | 51.1 | $R_9$ = −170.0 | $t_6$ = 20.0 |
| VII | 1.673 | 32.2 | $R_{10}$ = − 30.2 | $t_7$ = 7.5 |
| | | | $R_{11}$ = − 89.2 | $S_4$ = 9.0 |
| VIII | 1.755 | 47.2 | $R_{12}$ = + 83.1 | $t_8$ = 12.0 |
| | | | $R_{13}$ = ∞ | BF = 48.4 |

GEORGE H. AKLIN
INVENTOR
Daniel J. Mayne
BY Harold F. Bennett
ATTORNEY & AGENT

Patented July 10, 1951

2,559,836

UNITED STATES PATENT OFFICE 2,559,836

HIGH APERTURE CORRECTED PHOTO-GRAPHIC OBJECTIVE COMPRISING FIVE COMPONENTS IN AXIAL ALIGNMENT

George H. Aklin, Rochester, N. Y., assignor to Eastman Kodak Company, Rochester, N. Y., a corporation of New Jersey Application December 21, 1949, Serial No. 134,322

9 Claims. (Cl. 88—57)

1

This invention relates to lenses for photography and projection and particularly for use with lenticular film. Lenticular film is used for color photography and sometimes also for stereoscopic pictures.

The object of the invention is to provide an objective having the following characteristics which are highly desirable when working with lenticular film and particularly in connection with color photography:

(1) An extremely high aperture to provide sufficient light even when the banded color filter used in this process is interposed.

(2) A short front focal length so that the color filter may be placed at the front focal point without an inconveniently long support. The filter then appears at infinity when viewed from the film position.

(3) Lens apertures large enough to eliminate vignetting almost completely so as to retain the same color balance at different points in the film gate. It is obvious that any vignetting would cut out the central filter band less than those at the edges and would thus disturb the color balance.

(4) A high degree of correction of zonal spherical aberration so that the images formed by the light from the individual filter areas will be sharply in focus on the film. It is well known that these images lie along the caustic curve if spherical aberration is present.

A well known class of photographic objectives are those comprising two negative components spaced between two positive components. Within this broad class are several well recognized types, one of which is particularly favorable for lenses of high aperture covering a moderate angular field. In this type the negative components are each biconcave, or at least concave toward the adjacent positive components, and the positive components are compound. A known modification of this type includes an additional positive component placed behind the other four components making a five-component objective which has been used at very high apertures.

According to the present invention a lens of the latter kind is made up embodying at least one of several novel features each of which improves the lens and all of which cooperate to produce a greatly superior objective for color photography.

According to one feature of the invention, the front component consists of a biconcave element cemented between two positive elements whose refractive indices are greater than and on the

2 average between 0.06 and 0.30 greater than that of the biconcave element, the radii of curvature of the cemented surfaces being between 0.3F and F where F is the focal length of the objective. I have discovered that the zonal spherical aberration is reduced to an insignificant residue by this arrangement. Also, each of the two positive elements in this component should have a refractive index greater than 1.66 in order to reduce the Petzval sum of the objective, which otherwise may have too great a positive value for best correction of the astigmatism, and preferably the average index of the positive elements should be greater than 1.70. These indices may be as high as the availability of suitable glasses permits, at present up to about 2.0.

According to another feature of the invention, the power of the airspace between the two negative components is positive and less than the power of the objective as a whole, that is it has the shape of a dispersive lens element. Obviously this feature requires at least one of the negative components, preferably the front one, to be meniscus in shape. I have found that the meniscus shape of the front negative component is an aid in improving the lower rim rays of the oblique pencils. The shape of the other negative component was used as a variable during the designing of the objective for the purpose of controlling the primary aberrations especially coma and astigmatism, and this rear negative component may be meniscus, plano-concave, or biconcave. The refractive indices of these two components are conveniently between 1.55 and 1.75.

According to another feature of the invention, the fourth component, which is positive, has its more strongly curved surface toward the rear and consists of a negative element cemented to the back of a positive element of higher refractive index. It necessarily follows that the cemented surface is concave toward the front, and I have found it advantageous that the radius of curvature of this surface be between 0.2F and 0.6F, and that the front surface of this component be concave. Preferably the refractive index of the positive element is greater than 1.66, and the index of the negative element is less than that of the positive element by between 0.05 and 0.30.

According to still another feature of the invention, the rear positive component is separated from the other components by an airspace greater than 0.07F and less than 0.20F in order to decrease the front focal length for the purpose described above, has a refractive index greater than 1.66 in order to improve the Petzval sum, and has a dioptric power between 0.7 and 1.0 times the power of the objective as a whole and a shape such that the radius of curvature of its front surface is between 0.6F and 1.2F. It follows that the radius of curvature of the rear surface is numerically greater than about 1.4F. By these structural features I have been able to reduce the usual overcorrection of the oblique spherical aberration, especially that of the upper rim rays.

As regards the powers of the several components, I have had best results by making the first component stronger than the fourth and the third stronger than the second. Preferably the powers $P_1$, $P_2$, $P_3$, $P_4$ and $P_5$ of the five components, numbered in order from front to rear, are within the following limits:

$$P < P_1 < 1.6P$$
$$0.3P < -P_2 < 0.8P$$
$$P < -P_3 < 1.4P$$
$$0.3P < P_4 < P$$
$$0.5P < P_5 < 1.2P$$

where P is the power of the whole objective.

Also, I have found it advantageous to make the shape of the components such that the radii of curvature $R_1$, $R_5$, $R_7$, $R_9$ and $R_{12}$ of their front surfaces are as follows, the subscripts indicating the lens surfaces as numbered from the front to the rear of the objective:

$$0.75F < R_1 < 1.25F$$
$$0.5F < -R_5 < 0.9F$$
$$5F < \pm R_7$$
$$F < -R_9 < \infty$$
$$0.5F < R_{12} < 2F$$

The rear surface in each case is determined within limits by the previously stated limitations on the powers of the components.

The overall length of the objective from the front surface to the rear surface is conveniently between F and 1.4F. Of this length, the thicknesses of the lens components make up more than half, the components being unusually thick to give them the diameters required to avoid vignetting.

The accompanying drawing shows an objective according to the invention and data for one practical example thereof. This data is as follows:

EF=100 mm.   f/1.8

| Lens | N | V | Radii | Thicknesses |
|------|------|------|-------|-------------|
| I | 1.744 | 43.8 | $R_1 = +94.0$ mm. | $t_1 = 16.0$ mm. |
| II | 1.596 | 39.7 | $R_2 = -58.5$ | $t_2 = 6.2$ |
| III | 1.804 | 41.8 | $R_3 = +42.0$ | $t_3 = 16.3$ |
|  |  |  | $R_4 = +410$ | $s_1 = 4.8$ |
| IV | 1.649 | 33.8 | $R_5 = -64.6$ | $t_4 = 6.0$ |
|  |  |  | $R_6 = -145.9$ | $s_2 = 2.2$ |
| V | 1.689 | 30.9 | $R_7 = +1480$ | $t_5 = 6.0$ |
|  |  |  | $R_8 = +54.9$ | $s_3 = 13.2$ |
| VI | 1.734 | 51.1 | $R_9 = -170.0$ | $t_6 = 20.0$ |
| VII | 1.673 | 32.2 | $R_{10} = -30.2$ | $t_7 = 7.5$ |
|  |  |  | $R_{11} = -89.2$ | $s_4 = 9.0$ |
| VIII | 1.755 | 47.2 | $R_{12} = +83.1$ | $t_8 = 12.0$ |
|  |  |  | $R_{13} = \infty$ | BF = 48.4 |

In this table, the lens elements are numbered by Roman numerals in the first column and the corresponding refractive indices N for the D line of the spectrum and the dispersive indices V are given in the next two columns. The last two columns give the radii of curvature R of the lens surfaces, the thicknesses $t$ of the lens elements, and the spaces $s$ between the components, each numbered by subscripts from front to rear. The + and − values of R indicate surfaces respectively convex and concave to the front, and $R = \infty$ indicates a plane surface.

A slight modification of the above example has the same specifications for lens elements I, II, III, and IV and spaces $s_1$ and $s_2$, the remainder of the objective being as follows:

| Lens | N | V | Radii | Thicknesses |
|------|------|------|-------|-------------|
| V | 1.689 | 30.9 | $R_7 = +3960$ mm. | $t_5 = 6.0$ mm. |
|  |  |  | $R_8 = +56.2$ | $s_3 = 13.2$ |
| VI | 1.697 | 56.1 | $R_9 = -136.0$ | $t_6 = 21.0$ |
| VII | 1.673 | 32.2 | $R_{10} = -31.5$ | $t_7 = 7.5$ |
|  |  |  | $R_{11} = -69.4$ | $s_4 = 8.6$ |
| VIII | 1.734 | 51.1 | $R_{12} = +83.1$ | $t_8 = 12.0$ |
|  |  |  | $R_{13} = +2570$ | BF = 49.6 |

The front focal length is 13.2 mm. in the first example and 10.1 mm. in the modified form. I have aimed to keep the front focal length between 5 mm. and 20 mm. for convenience in mounting the filter.

The dioptric powers of the individual components of the first example are as follows: $P_1 = 1.32P$; $P_2 = -0.54P$; $P_3 = -1.21P$; $P_4 = +0.58P$; and $P_5 = +0.91P$. These are within the preferred range in each case. The power of the airspace $s_2$ between the two negative components, defined as the sum of the powers of the two surfaces which bound it, is $+0.49P$. The overall length of the objective, that is the sum of all the thicknesses and spaces, is 119.2 mm. All these values are substantially the same in the modified form of the objective.

It will be noted that the two cemented surfaces in the first component and the single cemented surface in the fourth component all have positive power, in accordance with these features of the invention. Also it is directly evident from the above table that the various radii of curvature and refractive indices are within the preferred ranges as specified. It may be noted further that all the negative elements have refractive indices between 1.5 and 1.75, and all the positive elements have indices between 1.66 and 2.0.

I claim:

1. A photographic objective consisting of five components in axial alignment of which the respective powers $P_a$, $P_b$, $P_c$, $P_d$ and $P_e$ are within the limits set forth by the following inequalities:

$$P < P_a < 1.6P$$
$$0.3P < -P_b < 0.8P$$
$$P < -P_c < 1.4P$$
$$0.3P < P_d < P$$
$$0.5P < P_e < 1.2P$$

where P is the power of the objective as a whole, and the overall length of the objective being between F and 1.4F where F is the focal length of the objective, characterized by the first component consisting of a biconcave element cemented between two positive elements each of which has a refractive index between 1.66 and 2.0 and the average of these two indices being greater than that of the biconcave element by between 0.06 and 0.30, and further characterized by the radii of curvature of the two cemented surfaces thus formed being numerically between 0.3F and F.

2. An objective according to claim 1 in which the second component is meniscus in shape and concave toward the front and the sum of the powers of the rear surface of the second component and the front surface of the third component is positive and smaller than the power of the objective as a whole.

3. An objective according to claim 1 in which the fourth component has its more strongly curved surface to the rear and consists of a positive element and a negative element cemented to the rear thereof, the refractive index of the positive element being higher than that of the negative element.

4. A photographic objective consisting of five components in axial alignment of which the respective powers $P_a$, $P_b$, $P_c$, $P_d$ and $P_e$ are within the limits set forth by the following inequalities:

$$P < P_a < 1.6P$$
$$0.3P < -P_b < 0.8P$$
$$P < -P_c < 1.4P$$
$$0.3P < P_d < P$$
$$0.5P < P_e < 1.2P$$

where P is the power of the objective as a whole, the first and fourth components being compound, and the overall length of the objective being between F and 1.4F, where F is the focal length of the objective as a whole, characterized by the fourth component being meniscus in shape, having its front surface concave and less strongly curved than its rear surface, and consisting of a positive front element whose refractive index is between 1.66 and 2.0 and a negative rear element cemented thereto whose refractive index is less than that of the positive element by between 0.05 and 0.30, and by the radius of curvature of the cemented surface so formed being between 0.2F and 0.6F, and further characterized by the fifth or rear component consisting of a single lens element having a refractive index between 1.66 and 2.0, having its front surface more strongly curved than its rear surface, and being spaced from the fourth component by more than 0.07F and less than 0.2F.

5. A photographic objective consisting of five components in axial alignment, of which the first and fourth counting from the front are compound and include a positive element cemented to a negative element of lower refractive index, in which the powers $P_a$, $P_b$, $P_c$, $P_d$, and $P_e$ of the five components respectively and the radii of curvature $R_a$, $R_b$, $R_c$, $R_d$, and $R_e$ of their respective front surfaces are within the limits set forth by the following algebraic inequalities:

$$P < P_a < 1.6P$$
$$0.3P < -P_b < 0.8P$$
$$P < -P_c < 1.4P$$
$$0.3P < P_d < P$$
$$0.5P < P_e < 1.2P$$
$$0.75F < R_a < 1.25F$$
$$0.5F < -R_b < 0.9F$$
$$5F < \pm R_c$$
$$F < -R_d < \infty$$
$$0.5F < R_e < 2F$$

where P is the power and F the focal length of the objective as a whole and where the + and − values of the radii indicate surfaces respectively convex and concave to the front, each negative element having a refractive index between 1.5 and 1.75, each positive element having an index between 1.66 and 2.0, and the overall length of the objective being between F and 1.4F.

6. An objective according to claim 5 in which the first component consists of a biconcave element and two positive elements cemented thereto, the radii of curvature of the cemented surfaces being between 0.3F and F and the refractive index of each positive element exceeding that of the biconcave element by between 0.06 and 0.30.

7. An objective according to claim 5 in which the rear surface of the second component is convex and the sum of the powers of this surface and the front surface of the third component is positive and less than the power of the whole objective.

8. An objective according to claim 5 in which the fourth component consists of a front positive element and a rear negative element cemented thereto, the refractive index of the negative element being lower than that of the positive element by between 0.05 and 0.30.

9. A photographic objective consisting of five components in axial alignment and made substantially according to the specifications in the following table:

| Lens | N | V | Radii | Thicknesses |
|---|---|---|---|---|
| I | 1.74 | 44 | $R_1 = +0.94$ F | $t_1 = 0.16$ F |
| II | 1.60 | 40 | $R_2 = -0.58$ F | $t_2 = 0.06$ F |
| III | 1.80 | 42 | $R_3 = +0.42$ F | $t_3 = 0.16$ F |
|  |  |  | $R_4 = +4$ F | $s_1 = 0.05$ F |
| IV | 1.65 | 34 | $R_5 = -0.65$ F | $t_4 = 0.06$ F |
|  |  |  | $R_6 = -1.5$ F | $s_2 = 0.02$ F |
| V | 1.69 | 31 | $R_7 = +15$ F | $t_5 = 0.06$ F |
|  |  |  | $R_8 = +0.55$ F | $s_3 = 0.13$ F |
| VI | 1.73 | 51 | $R_9 = -1.7$ F | $t_6 = 0.20$ F |
| VII | 1.67 | 32 | $R_{10} = -0.30$ F | $t_7 = 0.08$ F |
|  |  |  | $R_{11} = -0.90$ F | $s_4 = 0.09$ F |
| VIII | 1.75 | 47 | $R_{12} = +0.83$ F | $t_8 = 0.12$ F |
|  |  |  | $R_3 = \infty$ |  | where N and V in the second and third columns are the refractive indices for the D spectral line and the dispersive indices respectively of the corresponding lens elements numbered by Roman numerals in the first column in order from the front to the rear of the objective, and where R, $t$, and $s$ are the radii of curvature, thicknesses of lens elements, and spaces between components, each numbered by subscripts from front to rear, the + and − values of the radii indicating surfaces respectively convex and concave to the front, and F being the focal length of the objective.

GEORGE H. AKLIN.

REFERENCES CITED

The following references are of record in the file of this patent:

UNITED STATES PATENTS

| Number | Name | Date |
|---|---|---|
| 1,926,569 | Warmisham | Sept. 12, 1933 |
| 2,298,993 | Warmisham | Oct. 13, 1942 |
| 2,346,061 | Altman | Apr. 4, 1944 |
| 2,363,712 | Warmisham et al. | Nov. 28, 1944 |